April 8, 1930.  W. R. GREENHAW  1,754,097
BOLL WEEVIL AND VEGETATION EXTINGUISHER
Filed Feb. 7, 1929
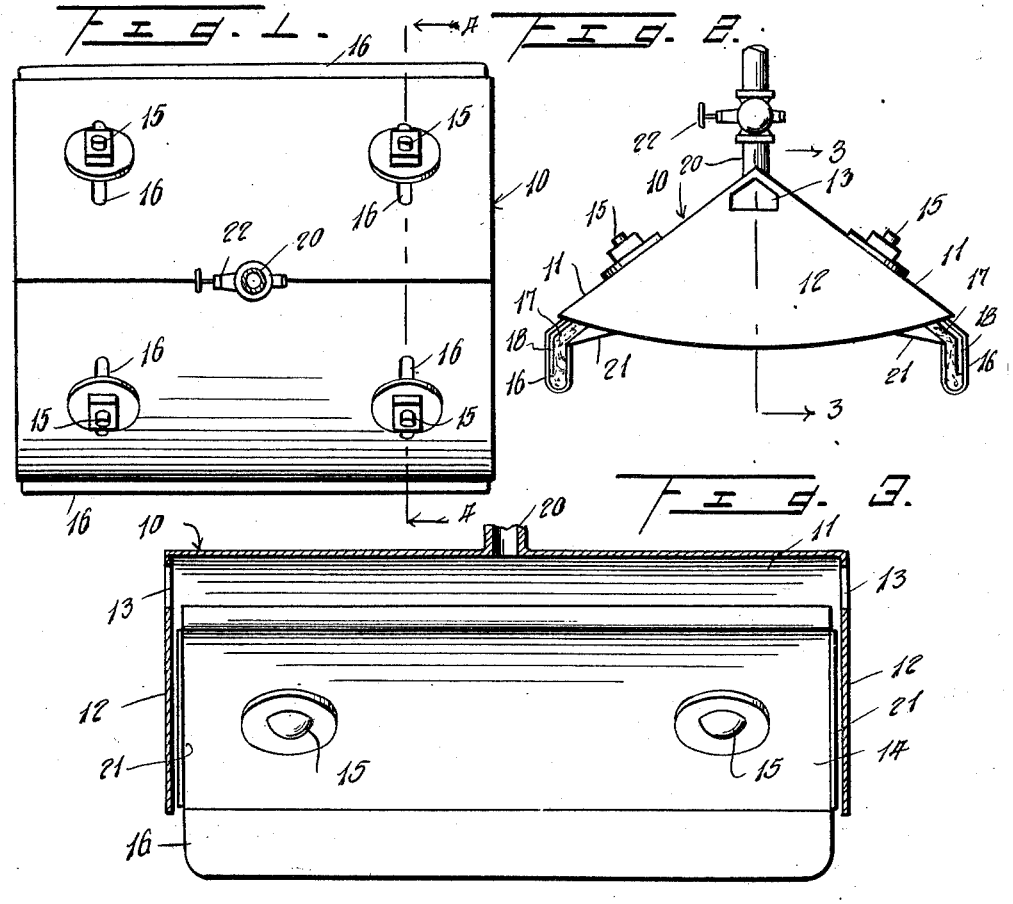
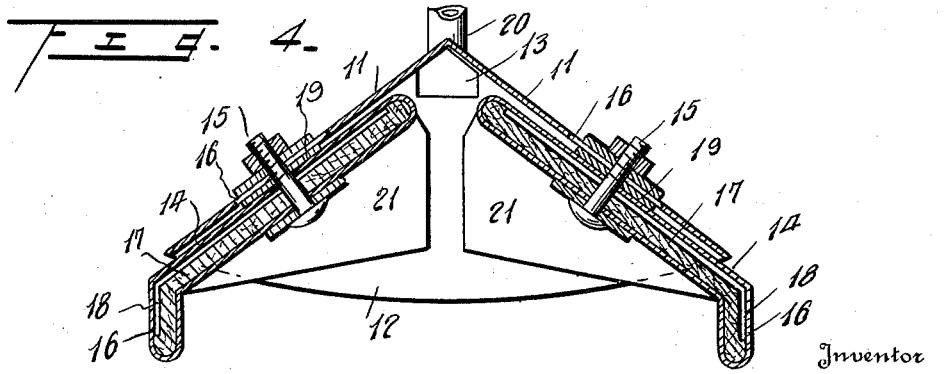

Patented Apr. 8, 1930

1,754,097

UNITED STATES PATENT OFFICE

WILLIAM R. GREENHAW, OF HEALDTON, OKLAHOMA

BOLL-WEEVIL AND VEGETATION EXTINGUISHER

Application filed February 7, 1929. Serial No. 338,215.

This invention relates to a means whereby the eggs or grub of the boll weevil which falls on the ground in cotton squares and small bolls, may be exterminated and weeds or undesired vegetation may also be exterminated.

It has been attempted to destroy the eggs and grub of the boll weevils by means of poison but it is a known fact that the poison does not penetrate the fallen squares and that the eggs and grub eventually hatch and destroy the crop. It is the main object of my invention to provide an effective means whereby such eggs or grub and fallen squares may be completely destroyed by burning the same while on the ground.

It is further aimed to provide a novel construction of hood adapted to traverse the ground, and have a flame provided therein to engage the squares, eggs or grub and vegetation.

Another object is to provide a novel construction whereby the parts are adjustable, cannot overheat, and air or oxygen may enter in the desired quantity to facilitate combustion.

Various additional objects and advantages will become apparent from a consideration of the description following taken in connection with accompanying drawings illustrating an operative embodiment.

In said drawings:—

Figure 1 is a plan view of the improved device,

Figure 2 is an end elevation thereof,

Figure 3 is a transverse sectional view taken on the line 3—3 of Figure 1, and

Figure 4 is a longitudinal sectional view taken on the line 4—4 of Figure 2.

Referring specifically to the drawings, a hood is provided at 10 which may be made of any desired metal or material, the same comprising inclined upper walls 11 and end walls 12, the latter adjacent the top having ports or openings 13 therethrough.

Supporting sections 14 are adjustably attached to the under sides of walls 11 by means of bolts 15, passing through elongated slots 16 in the walls. The lower ends of the supporting sections 14 are vertical as at 16 to constitute runners which travel along the ground. The sections 14 are preferably hollow or double walled as shown and contain a filling or lining of asbestos or other heat insulating material 17 therein, being spaced as shown at 18, from the outer walls of the supporting sections so as to avoid undue heating of the latter. Washers 19 disposed above the bolts 15 space the walls 11 and supporting sections apart.

Fuel of any desired sort is adapted to be supplied from any preferred source through the nozzle or torch 20 fastened to the hood 10 and adapted to discharge the fuel into the interior of the hood, the same being lighted or ignited as it issues from torch 20, a flame being continuously produced and acting against the objectionable boll weevil matter on the ground traversed.

Air to support combustion enters through the ports 13 and the amount of air may be varied by raising or lowering the sections 14, it being noted that the same carry flanges at their ends as at 21 and in the uppermost position, the latter partly extend across the ports 13 to more or less close them.

The device is adapted to be drawn over the ground in any manner preferred, for instance, as a separate implement or as an attachment secured to a harrow or the like, which would also carry the supply of fuel for the torch 20.

The supply of fuel to the torch 20 may be governed by a valve 22.

Various changes may be resorted to provided they fall within the spirit and scope of the invention.

I claim as my invention:

1. A device of the class described comprising a hood, a torch to produce a flame interiorly of the hood, an air entrance opening in the hood, and supporting means for the hood adjustable on the hood and having flanges movable by adjustment of said means to vary the extent of said opening.

2. A device of the class described comprising a hood, a torch to produce a flame interiorly of the hood, an air entrance opening in the hood, and supporting means for the hood adjustable on the hood and having flanges movable by adjustment of said means to vary the extent of said opening, said supporting means having the lower edges thereof constituting runners for engagement with the ground.

3. A device of the class described comprising a hood, a torch to produce a flame interiorly of the hood, an air entrance opening in the hood, supporting means for the hood adjustable on the hood and having flanges movable by adjustment of said means to vary the extent of said opening, said supporting means having the lower edges thereof constituting runners for engagement with the ground, and said supporting means being hollow and having heat insulating material therein.

4. A device of the class described comprising a hood, means for the supply of fuel into the same for ignition, supporting members for the hood, bolts adjustably securing said members to the hood, said hood having an entrance opening for air, and flanges on said supporting members adapted to extend partially over said openings to vary the extent thereof.

5. A device of the class described comprising a hood, means for the supply of fuel into the same for ignition, supporting members for the hood, bolts adjustably securing said members to the hood, said hood having an entrance opening for air, flanges on said supporting members adapted to extend partially over said openings to vary the extent thereof, means surrounding the bolts and spacing the supporting members from the adjacent walls of the hood, said supporting members having vertical portions at their lower edges to constitute runners, and heat insulating material within the supporting members spaced from the outer walls of the supporting members.

In testimony whereof I affix my signature.

WILLIAM R. GREENHAW.